(12) United States Patent
Malukhin et al.

(10) Patent No.: US 10,288,988 B2
(45) Date of Patent: May 14, 2019

(54) APPARATUS AND METHOD FOR STABILIZING VIRTUAL REALITY CAMERA CONFIGURATIONS

(71) Applicant: Spherica, Inc., San Francisco, CA (US)

(72) Inventors: Nikolay Malukhin, Moscow (RU); Ruslan Skvortsov, Moscow (RU)

( * ) Notice: Subject to any disclaimer, the term of this patent is extended or adjusted under 35 U.S.C. 154(b) by 0 days.

(21) Appl. No.: 15/874,921

(22) Filed: Jan. 19, 2018

(65) Prior Publication Data

US 2018/0210322 A1    Jul. 26, 2018

Related U.S. Application Data

(60) Provisional application No. 62/448,717, filed on Jan. 20, 2017.

(51) Int. Cl.
| | | |
|---|---|---|
| *G03B 17/56* | (2006.01) | |
| *H04N 5/247* | (2006.01) | |
| *H04N 5/225* | (2006.01) | |
| *G06T 19/00* | (2011.01) | |
| *G03B 37/04* | (2006.01) | |

(52) U.S. Cl.
CPC ........... *G03B 17/561* (2013.01); *G03B 37/04* (2013.01); *G06T 19/006* (2013.01); *H04N 5/2251* (2013.01); *H04N 5/247* (2013.01)

(58) Field of Classification Search
None
See application file for complete search history.

(56) References Cited

U.S. PATENT DOCUMENTS

| | | | | |
|---|---|---|---|---|
| 6,747,686 B1 * | 6/2004 | Bennett | ................... | G03B 35/00 |
| | | | | 348/145 |
| 10,047,898 B2 * | 8/2018 | Xie | .......................... | F16M 11/18 |
| 2015/0358538 A1 * | 12/2015 | Donaldson | ............. | G03B 17/02 |
| | | | | 348/38 |
| 2016/0381271 A1 * | 12/2016 | Cheng | ................... | F16M 11/041 |
| | | | | 348/208.2 |
| 2017/0075351 A1 * | 3/2017 | Liu | ........................ | B64C 39/024 |

* cited by examiner

*Primary Examiner* — Clayton E. LaBalle
*Assistant Examiner* — Dennis Hancock
(74) *Attorney, Agent, or Firm* — The Fraser Firm P.C.; Keith Fraser

(57) ABSTRACT

A camera stabilization system that is configured to stabilize a plurality of cameras mounted and positioned for virtual reality video recording. The system includes a support apparatus designed to accept and secure a variety of cameras with each camera in the support apparatus optimally orientated for recording still or moving images which can thereafter be processed to create a seamless, 360-degree image suitable for viewing with commercially available virtual reality head-mounted display (HMD). Stabilization of the apparatus is provided by means of stabilization system attached to the apparatus and which stabilization system includes a sensor, processor, controller and motors designed to receive indications about the horizon and dynamically stabilize motion along one or more of the X, Y, and/or Z axis of the apparatus, thereby allowing an operator to record steady, stabilized virtual reality images while moving the apparatus. Further, the attached stabilization system is located within the apparatus such that no part of the stabilization system is visible within the recording frame of any of the plurality of cameras while the cameras are in operation.

10 Claims, 10 Drawing Sheets

APPARATUS AND METHOD FOR STABILIZING VIRTUAL REALITY CAMERA CONFIGURATIONS

RELATED APPLICATIONS

This Application claims the benefit of priority under 35 U.S.C. 119(e) of the Provisional Application No. 62/448,717 filed Jan. 20, 2107. This provisional application is incorporated by reference herein in its entirety.

BACKGROUND OF THE INVENTION

1. Field of the Invention

The present invention relates primarily to the field of camera stabilization systems. More specifically, the invention relates to systems and methods for stabilizing a plurality of video cameras arranged for the purpose of recording video images for viewing in the virtual reality environment.

2. Description of the Prior Art

Virtual Reality is an increasingly popular format for viewing recorded still and motion picture images. These images are typically captured or recorded by utilizing a plurality of cameras that are positioned and held on a camera support system such that each camera is aimed at a different angular orientation and with the cameras of the system having a combined field of view sufficient to record a substantially 360-degree, spherical view. The images obtained from the cameras are then processed and "stitched" together using available software to create seamless 360-degree images. These images are then viewed using special "virtual reality" HMD that allow the user of such HMDs to view and experience the seamless 360-degree image by simply moving his or her head up down and to each side. Such panoramic views have proven a popular format for video games and there is an increasing demand for virtual reality, 360-degree video recordings of music concerts, sporting events, and narrative films.

Accordingly, with filmmakers increasingly interested in filming with virtual reality camera systems, there is now a need for the ability to capture virtual-reality images in more sophisticated, dramatic and artful ways as an aid to storytelling. One such way for filmmakers to capture such images is to move the virtual-reality camera system while filming. It is well known that the movement of a camera while filming introduces an undesirable jitteriness to the recorded image. Accordingly, with respect to single camera filming and recording, there exists a large number of camera support and stabilization systems designed to reduce or eliminate the jitteriness or other unwanted movement which occurs when an operator attempts to move the single camera while recording.

The movement of a virtual reality camera system, with its plurality of cameras arrayed and oriented to capture a 360-degree image, presents unique problems with respect to the stabilization of the resulting 360-degree, spherical image which the current technology does not address. Specifically, since the virtual reality camera system is designed to record the complete 360-degree environment surrounding the camera system, any "rigging" used to support and stabilize the camera would necessarily be recorded by the plurality of cameras recording that environment. Even more so than in traditional filmmaking, an image of the camera support and stabilizing equipment recorded by the camera and visible in the final virtual reality image would most decidedly "ruin the shot", as it would remove a user from enjoying the immersive virtual-reality experience that is its main claim to fame.

In addition, a virtual reality camera system, with its plurality of cameras positioned in the requisite manner to achieve a 360-degree spherical image, necessarily results in a system that is bulkier and more unwieldy than traditional camera support systems. Accordingly, a useful support and stabilization system for such an arrangement must be lightweight and compact enough to allow for relative ease of operation and movement by the virtual-reality filmmaker yet strong enough to support the plurality of cameras. Also, a useful support and stabilization system must be configured with the gimbals and associated hardware positioned inside the spherical array of cameras so that the cameras do not image and record any part of the gimbals and associated hardware.

Current stabilization systems for traditional film and video are insufficient for use with virtual reality because (1) the stabilization systems are not typically configured to stabilize a plurality of cameras and (2) to the extent that such systems are able to stabilize a plurality of cameras, such systems utilize stabilization motors and attendant hardware and controls mounted in positions such that if utilized for a virtual reality camera set-up, the image of the stabilization system would be recorded by the virtual reality cameras. In other words, the current stabilization technology is not designed to stabilize a plurality of cameras where the stabilization apparatus is located within the stabilization rig. The only solution is to design a new stabilization apparatus specifically for use in the 360-degree video recording environment. Also, while virtual reality camera support rigs exist in the art, for example, Kitner, U.S. Pat. No. 9,152,019, such systems provide no active stabilization and thus permit no useful movement of the virtual reality camera support system.

It is an object of this invention therefore to provide a 360-degree rig with a plurality of virtual reality cameras support and stabilization systems and methods that provides active stabilization of a virtual-reality camera system while maintaining and housing that stabilization system within a support apparatus such that stabilized, 360 degree images can be recorded by the virtual reality cameras without those cameras capturing in those recorded images any part of the support apparatus, the stabilization system and/or any attendant hardware used to operate the system. Another object of the invention is to provide a lightweight and compact virtual reality camera support and stabilization system that is easy to use, operate and move while recording virtual reality images. Another object of the invention is to provide embodiments of the invention allowing the operator of the virtual reality camera system to mount the virtual reality camera system to a wide variety of available camera mounting systems for use in moving a camera system, including dollys, drones, cables, cranes and other camera rig systems. Another object of the invention is to provide embodiments of the invention that accommodate and provide stabilization for a virtual reality camera system comprising any number of cameras, lenses, or other image-recording device or devices.

SUMMARY OF THE INVENTION

There is provided apparatuses and methods for stabilizing a plurality of cameras supported in a configuration that provides for the filming of a scene of interest in a 360-degree spherical panorama. The apparatuses and methods allow for the attachment of the camera support and stabilization apparatus to a wide variety of movable platforms commonly used in the motion picture industry for moving a traditional camera while filming a scene. Some common examples of such movable platforms include: handheld with operator movement; a tripod and dolly system; a rover; a cable; and a drone. The invention thus permits the recording of stabilized, 360-degree virtual reality images while moving the plurality of cameras. Such stabilized movement has heretofore been reserved for traditional film camera recording. Among other things, this capability in virtual reality camera systems allows filmmakers to employ a wide variety of camera movement techniques in virtual reality filmmaking to thereby create additional dramatic, creative, artistic and entertaining moments for the viewer of the virtual reality recording.

An embodiment of the invention may include a support apparatus designed to accept and retain a plurality of cameras in a predetermined orientation and further designed such that the plurality of cameras retained in the support apparatus are disposed in a radial array that provides the cameras with a 360-degree, spherical field of view. The support apparatus is further configured such that the array of retained cameras defines a central space outside of the field of view of the plurality of cameras and of sufficient size to allow the housing and securing within it of an active stabilization system secured to the support apparatus. The stabilization system may include three motors with which to provide the active stabilization of the support apparatus and cameras across three axes of movement. Each motor may be of the brushless variety, which provides finer and more direct control and movement of each motor. Each motor is in electronic communication with a sensor located on the support apparatus, said sensor designed to receive indications of the apparatus's horizon. Such information may then be transmitted to the motors through the stabilization system's control processor. The motors then act to level and stabilize the support apparatus based on the information received. The stabilization system may be powered through a power source located and secured on the support apparatus. The support and stabilization system may also include an attachment feature configured to secure the support and stabilization apparatus to a platform, for example, a tripod, to provide further stability and to serve as a means for moving the support and stabilization system with its plurality of cameras while filming to achieve the desired result of an actively stabilized 360-degree virtual reality image.

The stabilization motors of the stabilization system may in a preferred embodiment include a pitch motor for providing stabilization of the system along the pitch or "X" axis, a yaw motor for providing stabilization along the yaw or "Y" axis and a roll motor for providing stabilization along the roll or "Z" axis of the system. An embodiment of the invention provides that the motors be mounted in specific orientations in relation to each other. For example, the pitch motor, providing stabilization along the "X" axis may be oriented vertically within the support apparatus and at a 90-degree angle to both the yaw motor and the roll motor. The yaw motor, providing stabilization along the "Z" axis, may then be mounted in a horizontal orientation to the roll motor. The pitch motor, providing stabilization along the "Y" axis, is oriented 90 degrees vertically from the Yaw motor. The mounting of the motors in the desired orientation is accomplished by the use of mounting plates attached to the motors configured to secure each motor in the desired orientation.

In addition to the orientation of a motor with respect to each other motor, the arrangement within the central space of the motors so orientated will also depend on the type of portable platform to which the system is to be secured. For example, an embodiment of the support and stabilization apparatus provides for the attachment of the apparatus to a cable system along which the apparatus can move. Attachment of the apparatus to such a cable system is typically accomplished with a point of attachment below the cable system by means of a monopod or a point of attachment within the assembly. In such instances, the arrangement of the motors within the support apparatus will be such that each motor maintains its control over the specific axis it is designed to control. Similar motor arrangements may be necessary where other movable platforms are used wherein the support and stabilization apparatus is attached to the platform from below, for example, a drone platform typically provides for the attachment of the apparatus below the drone. Accordingly, the motors are arranged in a manner that will allow each motor to properly control the specific axis it is assigned to control. Other movable platforms call for attachment of the support apparatus above the platform, for example, a tripod or rover. The system can be calibrated to work in either position with the sensors able to provide proper indications about the horizon to the motors. An embodiment of the invention may provide for an orientation of the motors in an additional manner depending on the resulting orientation of the stabilizing system when attached to a particular movable platform.

Further, the support apparatus may include also an attachment feature configured to attach the support and stabilization system to a platform, for example a tripod and dolly system. Other embodiments may provide that the attachment feature be located or incorporated into the stabilization system. Such a stabilization system may have a point of attachment for its attachment to the support apparatus and another point of attachment for the attachment of the system to the movable platform.

A preferred method of stabilizing a plurality of cameras according to the invention then becomes apparent and may comprise the steps of securing a plurality of cameras within a support apparatus configured to orient the secured plurality of cameras in a generally spherical array; securing a stabilizing system, comprising at least one stabilizing motor, a horizon level sensor, motor controller and power source, to the support apparatus outside of the field of view of the plurality of cameras; and mounting the support and stabilizing system on a movable or otherwise portable platform for operation.

A more detailed description of the embodiments together with other and further features and advantages is made in the following description in conjunction with the accompanying drawings. The scope of the invention will be pointed out in the appended claims.

DETAILED DESCRIPTION OF THE INVENTION

Apparatuses and Methods for stabilizing a plurality of cameras oriented and utilized to record a series of still or motion picture images for 360-degree virtual reality viewing are disclosed herein. Certain details are set forth below to provide sufficient understanding of embodiments of the invention. However, it will be clear to one having skill in the art that embodiments of the invention may be practiced without these particular details. Moreover, the particular embodiments of the present invention described herein are provided by way of example and should not be used to limit the scope of the invention to these particular embodiments. In other instances, well known circuits, control signals, and software operations have not been shown in detail to avoid unnecessarily obscuring the invention.

Figure 1:
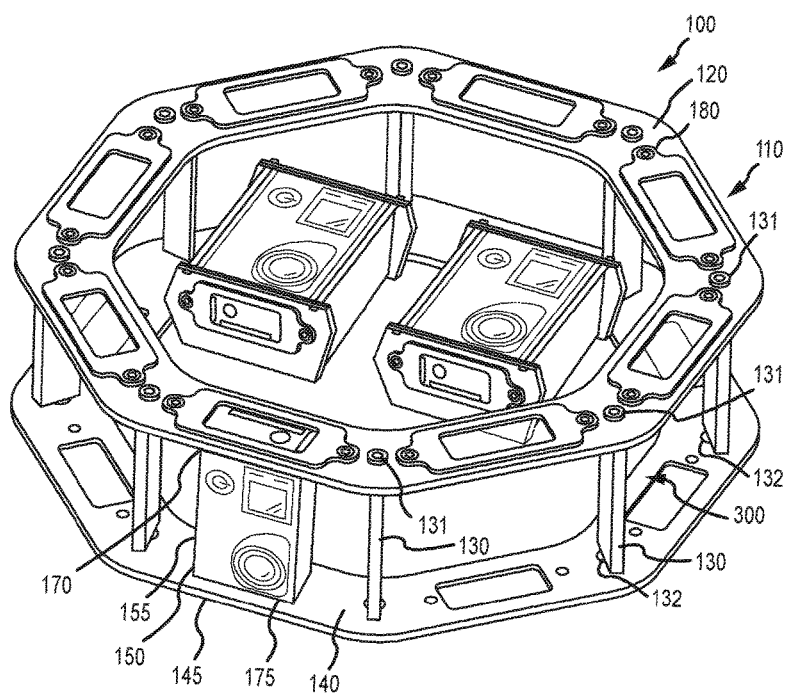
FIG. 1 is a perspective view of an embodiment of the camera support apparatus.

FIG. 1 is a perspective view of a support and stabilization apparatus (100) according to an embodiment of the invention. The apparatus (100) includes a support structure (110) defined by a top surface (120), a plurality of support columns (130) disposed along the top surface (120), each support column (130) including a proximal end (131) threadably secured to the underside of the top surface (120) and extending downward from the top surface (120) to a distal end (132) which is threadably secured to a housing ring (140). The housing ring defines a bottom surface (145) of the support structure (110). The support structure (110) also includes a plurality of camera receptacles (150) disposed along the housing ring (140). The camera receptacles (150) are configured to retain a plurality of photographic cameras (155) and further configured to orient the cameras (155) in a manner that provides the plurality of cameras (155) with a 360-degree field of view around the perimeter of the housing ring (140).

As show in FIG. 1, according to this embodiment, once inserted or placed within the receptacle (150), each camera (155) is secured within the receptacle (150) by a securing means including receptacle plates (180) disposed against both the upper surface and against the bottom surface (145). The receptacle plates (180) are connected via two screws positioned on either side of the camera receptacle (150) and that extend through the upper surface (120) and to the bottom surface (145). When tightened, they secure the camera (155) within the camera receptacle (150). Preferably, the receptacle plates (180) are configured to provide for ease of access to the camera, the camera's controls, and to provide sufficient cooling for the camera while in operation while it also maintains a sufficient hold of the camera to prevent it from any unwanted movement or shaking within the receptacle (150).

Figure 2:
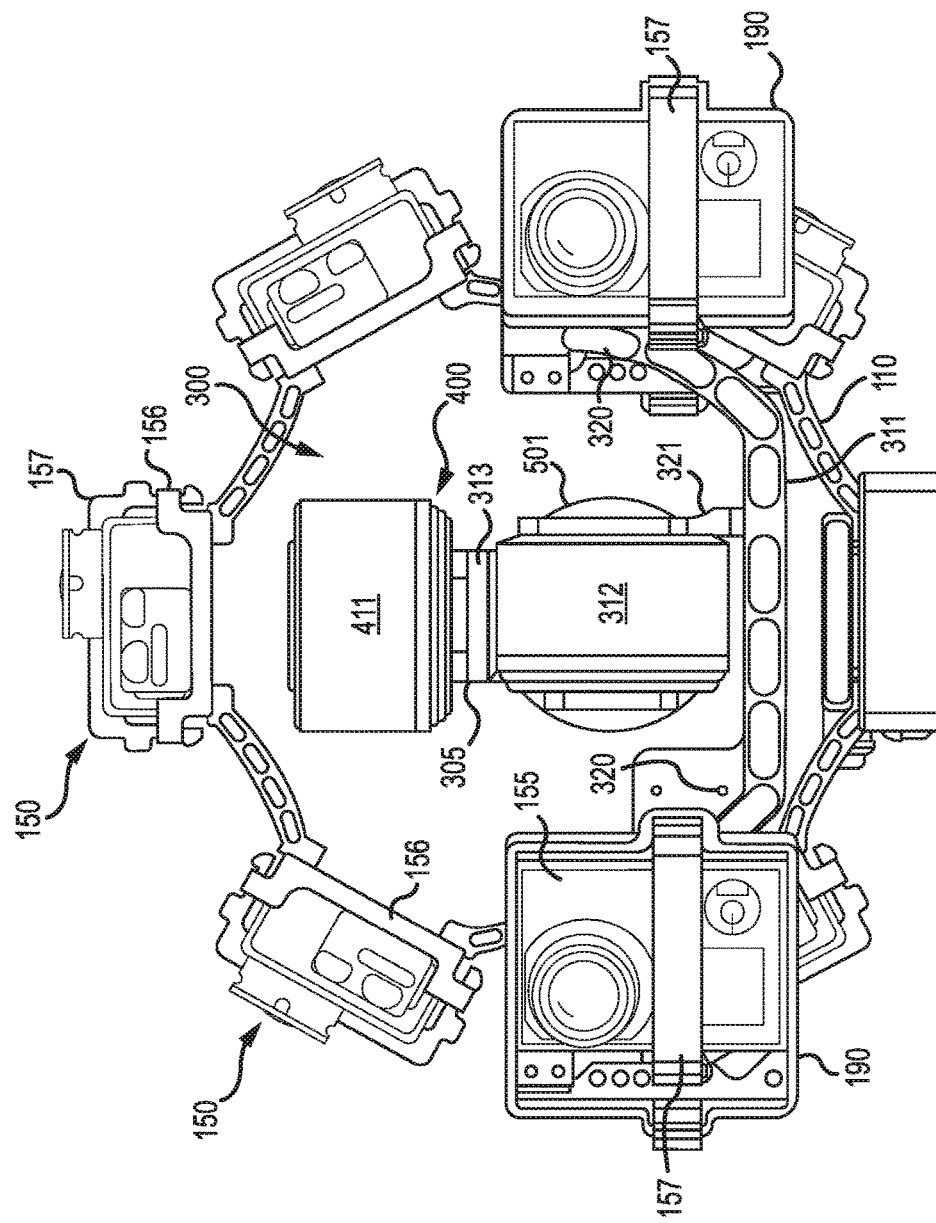
FIG. 2 is a top view of another embodiment of the camera support and stabilization apparatus.

In another embodiment of the invention, shown in FIG. 2, the support apparatus consists of the support structure (110) and attached camera receptacles (150). Each camera receptacle (150) comprises a camera housing (156). The camera housing (156) is secured to the support structure (110) and is configured to accept a camera (155) and comprises an integrated holding strap (157), preferably with a latch mechanism, which is used to further secure the camera (155) into the camera receptacle (150).

In the embodiment shown in FIG. 1, each camera receptacle (150) will preferably be positioned between two support columns (130) with sufficient space between each support column (130) and the camera receptacle (150) to provide access to the camera controls and further positioned with generally equal distances between the support column (130) on one side of the camera (155) and the support column (130) on the other side of the camera (155). This arrangement provides a satisfactory level of overall support for the support structure (110) as well as provides an even distribution of weight of the support structure (110), a factor that assists in the efficient operation of the stabilizing motors discussed in more detail below.

Figure 5:
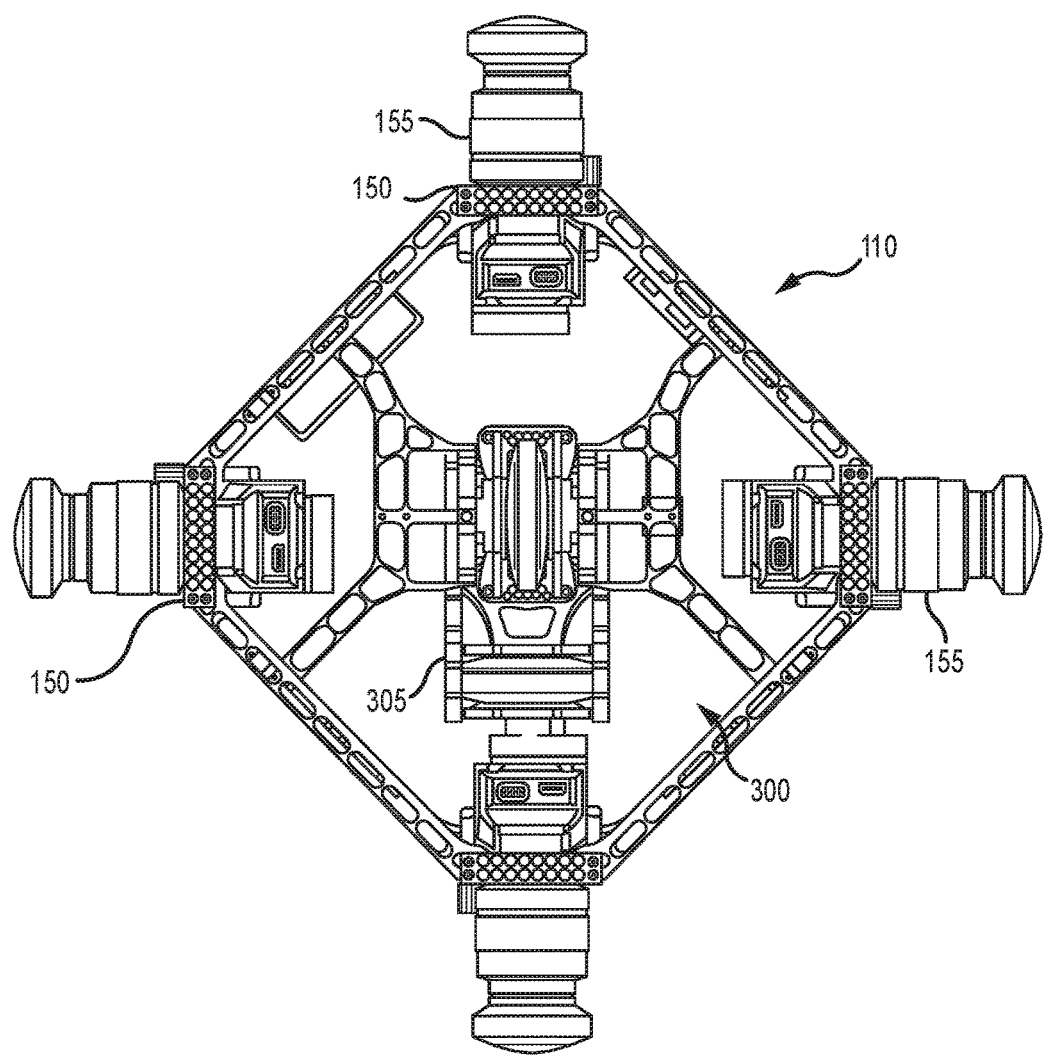
FIG. 5 is a top view of another embodiment of the camera support and stabilization apparatus.

The embodiment shown in FIGS. 1 and 2 show a camera receptacle configured to accept a 'GoPro'™ style of commercially available camera that is popular for virtual-reality filmmaking. That and similar cameras are capable of either still or motion-picture photography, are compact, can be operated remotely, and the image files created are compatible with commonly available and popular virtual reality stitching software. However, the invention is designed and can be configured to operate with any type of camera including a wide variety of DLSR and cinema camera with a wide variety of lens attachments. For example, FIG. 5 shows an embodiment of the invention wherein the camera receptacles (150) are configured to accept larger cinema cameras (155) such as the Black Magic™ brand of camera (155).

It is noted here that the support structure (110) is of a generally circular shape. However, the specific polygonal shape of the support structure (110), will preferable be related to the number of camera receptacles (150) that are located along the perimeter of the support structure (110) and the orientation of those cameras (155). For example, FIG. 1 shows the invention configured to hold eight cameras around the perimeter of the support structure (110). As can be seen in FIG. 1, the camera (155) is positioned within the camera receptacle (150) and, as discussed above, a support column (130) is positioned on either side of the camera receptacle (150). Accordingly, the polygonal shape of the support structure's upper surface (120) and corresponding housing ring (140) is an octagon. Thus shaped, each of eight vertical planes defined by each side of the octagonal shaped upper surface (120) and correspondingly shaped housing ring (140) includes a camera receptacle (150) flanked by two support columns (130), one on either side of the receptacle (150). Similarly, as shown in FIG. 2, a support structure configured to retain six cameras (150) along the perimeter of the support structure (110) would result in a support structure (110) of a hexagonal shape. However, this correspondence will be more loosely adhered to in other embodiments. For example, as shown in FIG. 5, the use of larger cameras (155) along the support structure (110), with their attendant larger camera receptacles (150), will necessarily result in a support structure shape that does not correspond with the number of camera receptacles (150). In any embodiment though, a configuration scalable in this manner provides optimal orientation of the plurality of cameras (155) disposed along the perimeter of the support structure (110) to capture a 360-degree panoramic image.

Figure 3:
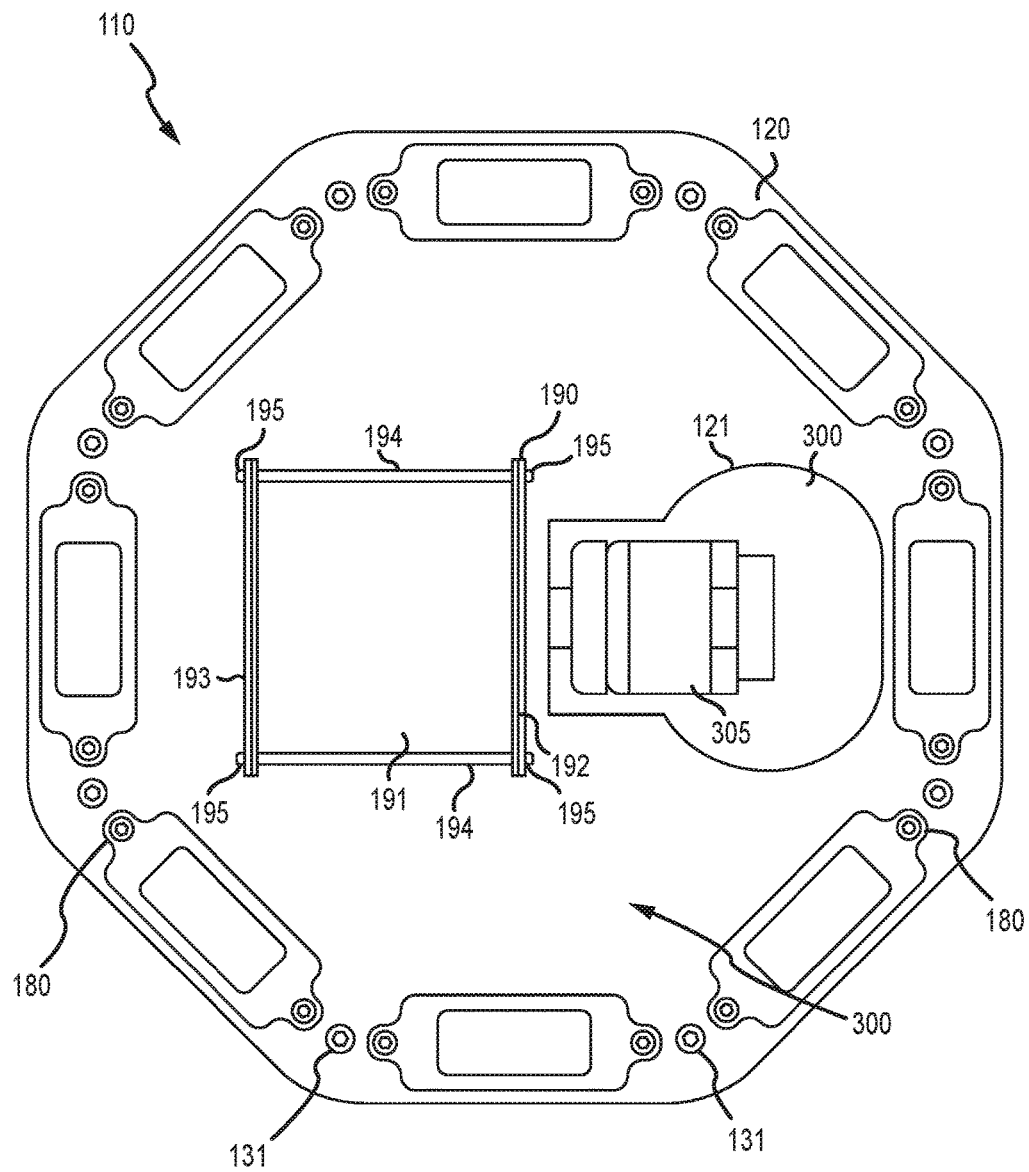
FIG. 3 is a top view of another embodiment of the camera support and stabilization apparatus.

As shown in FIG. 3, the support structure (110) of an embodiment includes also at least one upper camera receptacle (190) disposed on the top surface (120) and configured to orient a camera such that it captures an image above the support structure (110). While the embodiment shown in FIG. 3, provides for one camera receptacle, it is understood that an embodiment may include additional upper camera receptacles (190) and disposed along the top surface (120) to maximize the field of view above the top surface (120). As shown in FIG. 3, each upper camera receptacle (190) may be integral to the top surface (120) or, alternatively, connected by fasteners or other means to the top surface (120). The upper camera receptacle (190) is defined by a backing plate (191), which provides a point of attachment or integration to the top surface (120), an outer side wall (192), an inner side wall (193) that is essentially parallel to the outer side wall (192), and an open end (191). Both the inner side wall (193) and outer side wall (192) include two tabs (195) disposed on either side of the inner side wall (193) and outer side wall (192). According to this exemplary embodiment, a camera may be inserted through the open end with the back of the camera resting on the backing plate and each side of the camera in contact with the inner side wall (193) and outer side wall (192) respectively. The camera is secured in the upper camera receptacle (190) by two threadable connections (194), each with a proximal end secured through each tab (195) on the outer side wall (192) and a distal end threadably secured to each tab (195) of the inner side wall (193). Alternatively, as shown in FIG. 2, each upper camera receptacle (190) may be secured to the support structure (110) and configures to accept a camera (155) and comprising an integrated strap (157) configured to secure the camera (155) to the upper camera receptacle (190).

Figure 4:
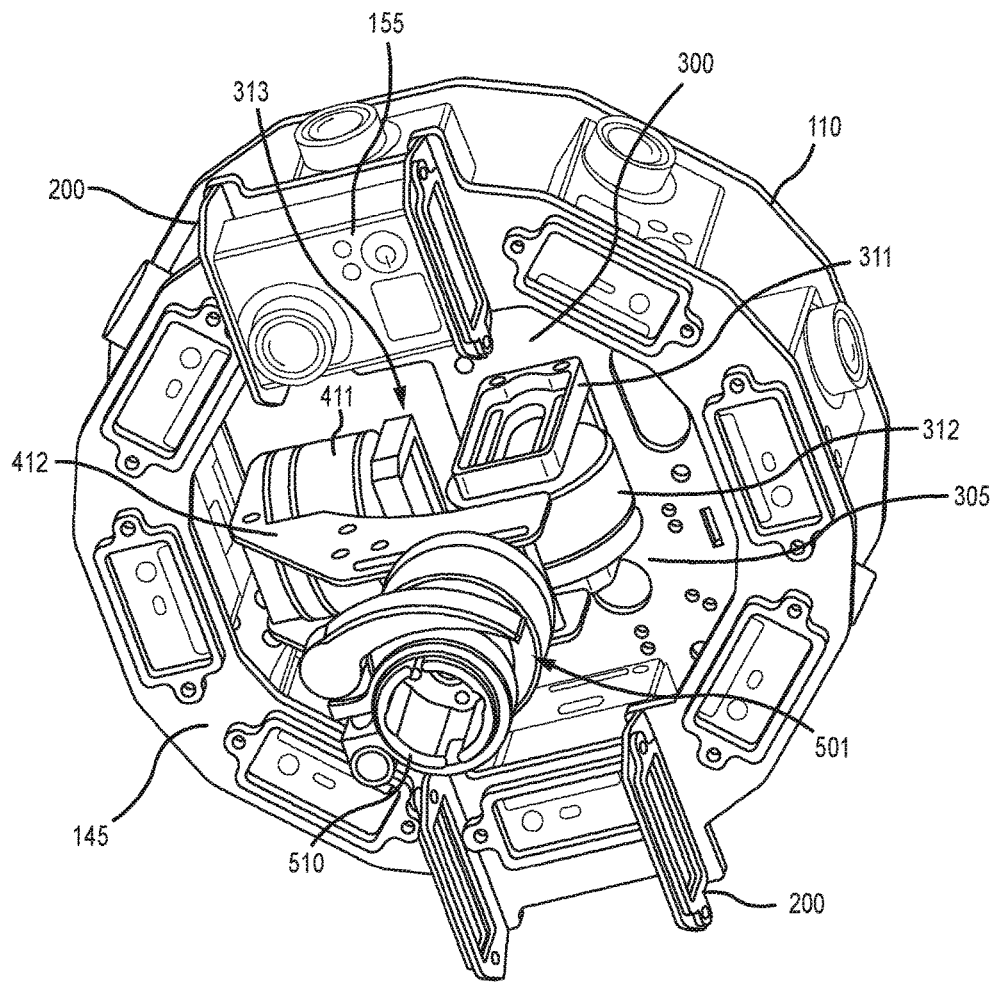
FIG. 4 is a bottom perspective view of an embodiment of the camera support and stabilization apparatus.

FIG. 4 shows an embodiment of the invention wherein the support structure (110) includes at least one lower camera receptacle (200) disposed on the bottom surface (145) and configured to orient a camera (155) such that it captures images below the support structure (110). In the embodiment shown in FIG. 4, two lower camera receptacles (200) are each configured as the upper camera receptacles described above and shown in FIG. 3, and are secured or otherwise attached to the underside of the bottom surface (145). In other embodiments it is understood that a lower camera receptacle (200) can be secured to the support structure (110) and oriented to hold and affix a camera (155) such that it captures images below the support structure (110) with said affixation of the camera (155) accomplished by a securing means.

It is also understood that the invention may be practiced by an embodiment without the use of any upper camera receptacles and/or without any lower camera receptacles. FIG. 5 shows one such embodiment of the invention. Specifically, the support structure (110) of FIG. 5 comprises four camera receptacles (150) disposed along the support structure (110) and otherwise arrayed around the perimeter of the support structure (110). The cameras (150) contained within each camera receptacle (155) are equipped with super fish-eye lenses. Such camera systems arrayed as shown in FIG. 5 would provide for the capture of a spherical, 360-degree image suitable for virtual reality recording.

As shown in FIG. 1, the support structure (110) should ideally be manufactured of a suitable material having adequate strength and rigidity while being lightweight for ease of use. One such preferred material is carbon fiber. Other suitable materials include moldable plastic or nylon and aluminum, tempered aluminum and/or other types of hardened aluminum such as Duralumin.

As shown in FIG. 1, the support structure (110) thus configured will also define a central space (300). As shown in FIG. 1, the central space (300) is bounded from above by the top surface (120) and bounded on its sides by the plurality of support columns (130) and the plurality of camera receptacles (150) disposed along the perimeter of the support structure (110).

As shown in FIG. 4, secured to the support structure (110) and disposed within the central space (300) is a stabilization assembly (305). FIG. 3 show an embodiment wherein the top surface (120) is configured to include a top surface opening (121). The top surface opening (121) is disposed along the top surface (120) to allow for the free movement of the stabilization assembly (305) without it coming into contact with the underside of the top surface (120). Referencing back to FIG. 4, the stabilization assembly (305) is secured to the underside of the top surface (120) by means of a first mounting plate (311). A pitch motor (312) is secured to the first mounting plate (311) and oriented vertically within the central space (300). As shown in FIG. 4, the first mounting plate (311) will preferably be "L-shaped" or similarly configured to permit the pitch motor (312) to be properly oriented in a vertical position relative to the central space (300). A second mounting plate (313) is secured to the pitch motor (312) and as shown in the preferred embodiment of FIG. 4, the second mounting plate (313) is secured to pitch motor (312) on the opposite side from where the pitch motor (312) is secured to the first mounting plate (311). A roll motor (411) is secured to the second mounting plate (313) and oriented at a 90-degree angle to the pitch motor (312). As shown in the preferred embodiment of FIG. 4, the second mounting plate (313) will also be "L-shaped" or otherwise configured to allow the roll motor (411), once secured, to be oriented at a 90-degree angle to the pitch motor (312). A third mounting plate (412) is secured to the roll motor (411) and as shown in the preferred embodiment of FIG. 4, the third mounting plate (412) is secured to the roll motor (411) on the opposite side from where the roll motor (411) is secured to the second mounting plate (313). A yaw motor (501) is secured to the third mounting plate (412) and oriented at a 90-degree angle to both the roll motor (411) and the pitch motor (312). In the embodiment shown in FIG. 4, the third mounting plate is configured to allow proper orientation of the yaw motor with respect to both the roll motor and pitch motor and to also permit movement of the stabilization assembly within the central space (300) when the stabilization assembly (305) and apparatus are connected to a tripod or other similar mounting. As shown in FIG. 4, the stabilization assembly includes a mount (510) for securing the stabilization assembly (305) and support structure (110) to a tripod, monopod or other supporting platform.

Figure 7A:
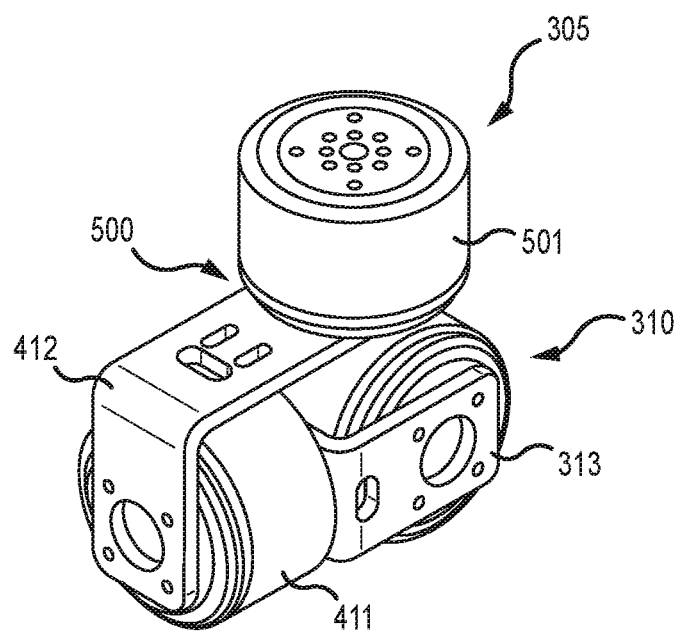
FIG. 7(a) is a perspective view of an embodiment of the stabilization assembly of the invention.

FIGS. 7(*a*) and 7(*b*) show the stabilization assembly (305) of particular embodiments of the invention removed from the support structure and central space of the invention so as to provide a clearer view of the structures associated with the stabilization assembly (305) as well as their configuration and orientation. Specifically, as shown in FIG. 7(*b*), the stabilization assembly (305) comprises a first mounting plate (311), (which, as shown in FIG. 2, is attached to the support structure (110)), a pitch motor (312) is secured to the first mounting plate (311), (which, as shown in FIG. 4 is oriented vertically within the central space (300)). As shown in FIG. 7(a), second mounting plate (313) secured to the pitch motor. As shown in FIG. 7(a), a roll motor (411) is secured to the second mounting plate (313) and, as shown in FIG. 4, is oriented at a 90-degree angle to the pitch motor (312). FIG. 7(a) shows a third mounting plate (412) that is secured to the top of the roll motor (411). Also, in FIG. 7(a), A yaw motor (501) is attached to the third mounting plate (412) and oriented at a 90 degree angle to both the roll motor (411) and pitch motor (312). In the embodiment shown in FIG. 7(a), which is the same embodiment as shown in FIG. 4, the mount (510) is configured to secure the stabilization apparatus (305) to a platform such as a tripod.

Figure 6:
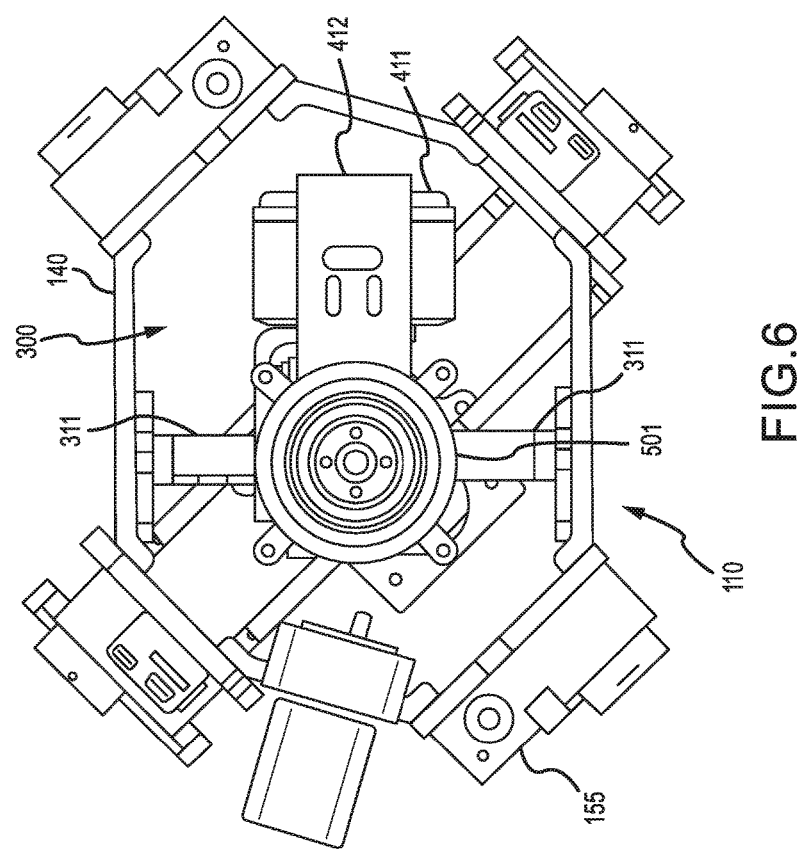
FIG. 6 is a bottom view of another embodiment of the camera support and stabilization apparatus.
Figure 7B:
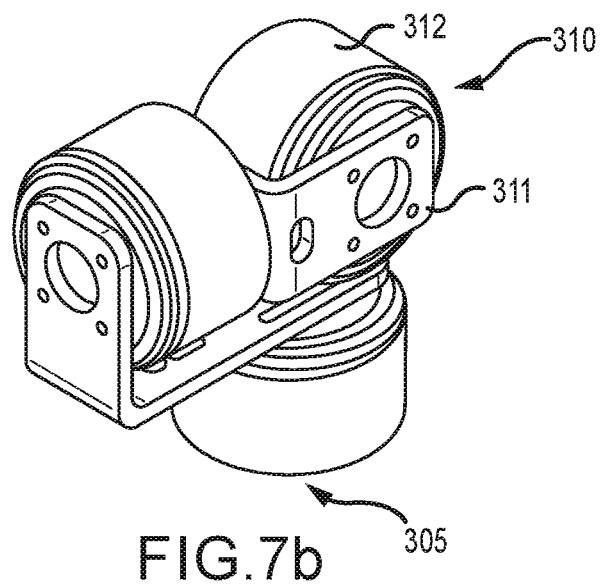
FIG. 7(b) is another perspective view of an embodiment of the stabilization assembly of the invention.
Figure 8A:
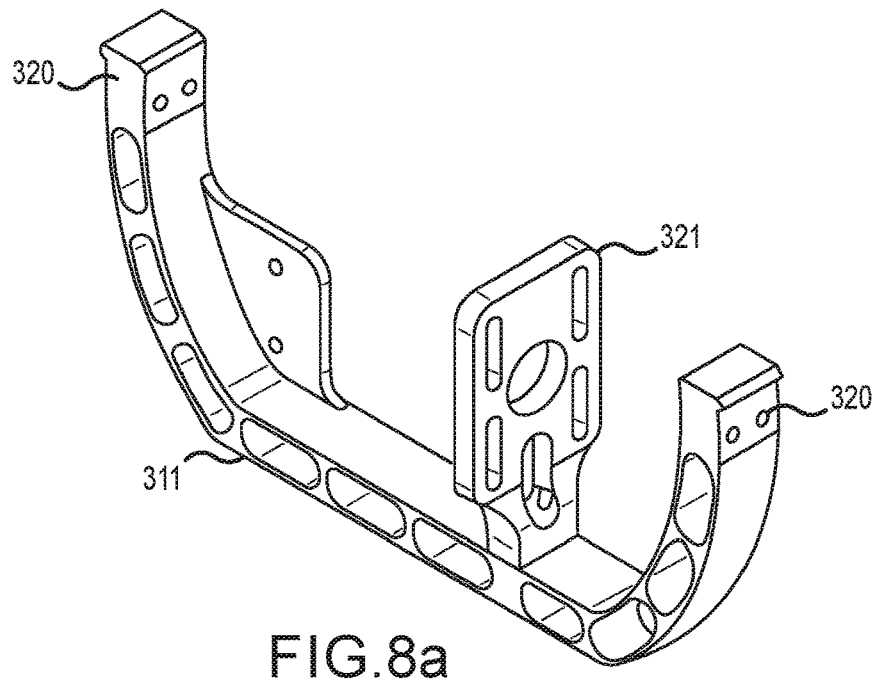
FIG. 8(a) is a perspective view of the First Mounting Plate of the stabilization assembly of an embodiment of the invention.

As seen in FIGS. 7(a) and 7(b), as well as FIG. 2 and FIG. 6, the positioning of the stabilization assembly (305) within the central space (300) and the orientation of each motor relative to the other motors of the stabilization assembly (305) is achieved through configuration of the mounting plates. Using this same general configuration, several embodiments of the invention can be achieved depending on how the apparatus is to be supported, (for e.g., from above with a cable system, from below with a conventional tripod, or attached to a drone). Specifically, in the embodiment shown in FIG. 2, integral to the first mounting plate (311) are two mounting brackets (320) for securing the first mounting plate (311) to the support apparatus (110). The mounting brackets (320) are configured and disposed along the first mounting plate (311) in a manner to provide a stable platform for the stabilization assembly and to position the stabilization assembly within the central space (300). The first mounting plate (311) also provides a pitch motor mounting bracket (321) disposed on the first mounting plate (311) and configured for securing the pitch motor (312) in a vertical orientation within the central space (300). The structures associated with the first mounting plate for this embodiment are shown in more detail in FIG. 8(a). There, the first mounting plate (311) of an embodiment of the invention comprises at least one mounting bracket (320) to secure the first mounting plate (311) to the support apparatus (110) (shown, for example in FIG. 1) and a motor mounting bracket (321). As shown in FIGS. 7(a) and 7(b), the second mounting plate (313) is then secured to the opposite side of the pitch motor (312) and is configured in an L-shape for disposing the roll motor (411) at a 90-degree angle to the pitch motor (312). The third mounting plate (412) is also configured in a L-shape and secured to the roll motor (411) and securing the yaw motor (501) with the yaw motor (501) disposed horizontally to the roll motor (411) and at an angle that is 90-degrees from both the roll motor (411) and the pitch motor (312). So configured, and as shown in FIG. 8(c), and FIG. 7(a), the third mounting plate (412), which is secured to both the yaw motor (501) and the roll motor (411), will have sufficient dimension to position the yaw motor (501) directly above the pitch motor (312) with the central space (300)

Another embodiment is shown in FIG. 6. There, the first mounting plate (311) spans the central space (300) and is secured to the support structure (110) at two places along the housing ring (140). Similarly, as shown in the embodiment illustrated by FIG. 5, the stabilization assembly (305) spans the central space and is secured to the support structure (110) at four points.

Figure 8B:
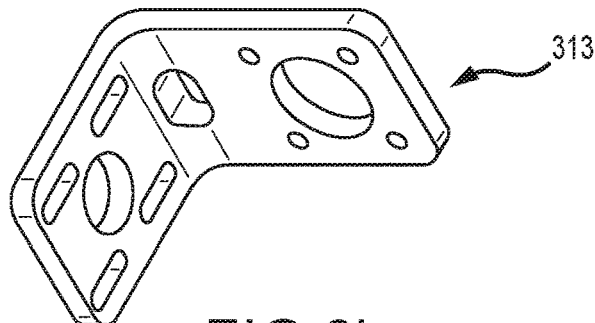
FIG. 8(b) is a perspective view of the Second mounting Plate of the stabilization assembly of an embodiment of the invention.
Figure 8C:
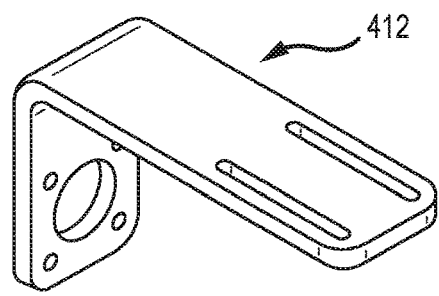
FIG. 8(c) is a perspective view of the Third Mounting Plate of the stabilization assembly of an embodiment of the invention.

FIG. 8(b) shows details of the second mounting plate (313) of the stabilization assembly (305) of the embodiment of the invention illustrated in FIG. 4. Similarly, FIG. 8(c) shows details of the third mounting plate (412) of the stabilization assembly (305) of the embodiment of the invention illustrated in FIG. 4.

In reference to the various embodiments illustrated, like the support structure (110), the mounting plates of the stabilization assembly (300) are preferably constructed of tempered aluminum, or carbon fiber or other lightweight yet strong material. Other configurations for the stabilization assembly (300) are possible depending on the configuration of the specific support structure (110) and its associated configuration of the plurality of cameras (150). For each configuration however, the pitch motor (312) shall be positioned vertically with respect to the support apparatus and at an angle of 90-degrees to both the roll motor (411) and the yaw motor (501). Also, the roll motor (411) shall be positioned vertically and at 90-degrees to the yaw motor (501). It necessarily will follow, therefore, that the yaw motor (501) be positioned horizontally to the roll motor (411) and at an angle of 90 degrees to the pitch motor (312).

In additional reference to the illustrations of the various embodiments of the invention, the motors of the stabilization apparatus (305) are preferably of the brushless variety, consistent with its role as a load bearing motor and also to provide the desired level of accuracy and precision of movement of the stabilization apparatus under operation. The size of the motors will vary depending on the number of cameras (150) and the corresponding weight of the support apparatus (100).

As set forth above, the support and stabilization apparatus (100) (as referenced in the various illustrated embodiments) is scalable as to the number of cameras used. The apparatus (100) is also scalable with respect to the type and size of camera used. To stabilize a large number of cameras or to stabilize a support structure (110) that is otherwise heavily laden with cameras and ancillary equipment, motors of sufficient size shall be employed. The support and stabilization system (100) of the instant invention is most optimally suited for motors with diameters between 20 mm and 300 mm.

Figure 9:
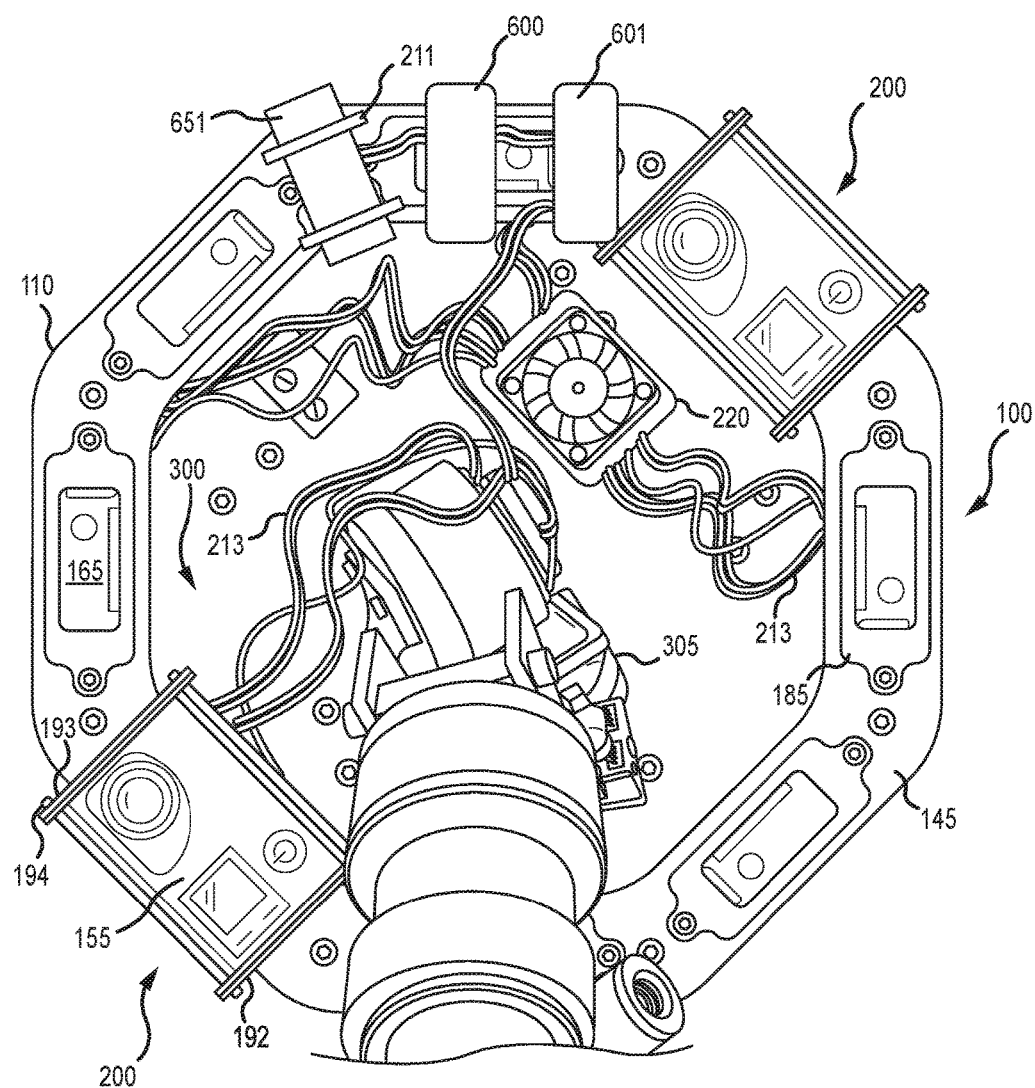
FIG. 9 is a bottom perspective view of an embodiment of the invention showing the motors, controller and sensor components of the support and stabilization assembly.

Referring to FIG. 9, for operation of the motors of the stabilization assembly, the stabilization assembly includes a power source which, in a preferred embodiment, will be a portable battery (651) secured to the support structure (110) and connected to a controller (600) which in a preferred embodiment will be of the 32 bit, single integrated circuit type commonly found in the art and that contains a processor core, memory, and programmable input/output peripherals. The controller (600) is secured to the support apparatus and is in electronic communication with a sensor (601) also secured to the support apparatus, with FIG. 9 showing the sensor (601) located on the underside of the top surface. It is understood that the sensor can be located at any suitable location on the apparatus. The sensor (601) will preferably be of the inertial measurement unit (or IMU) variety of the type found in the art, that is, designed to detect changes in rotational attributes of pitch, roll and yaw of a system. So integrated on the support and stabilization apparatus (100) as shown in FIG. 9, the sensor (601), detects and received information regarding the horizon level and changes in the pitch, roll and yaw movement of the support and stabilization apparatus (100) and relays that information to the controller (600). The controller (600) processes the information pursuant to commercially available, programmed codes specific to and consistent with the relative arrangement of the motors of the stabilization apparatus (300).

Figure 10:
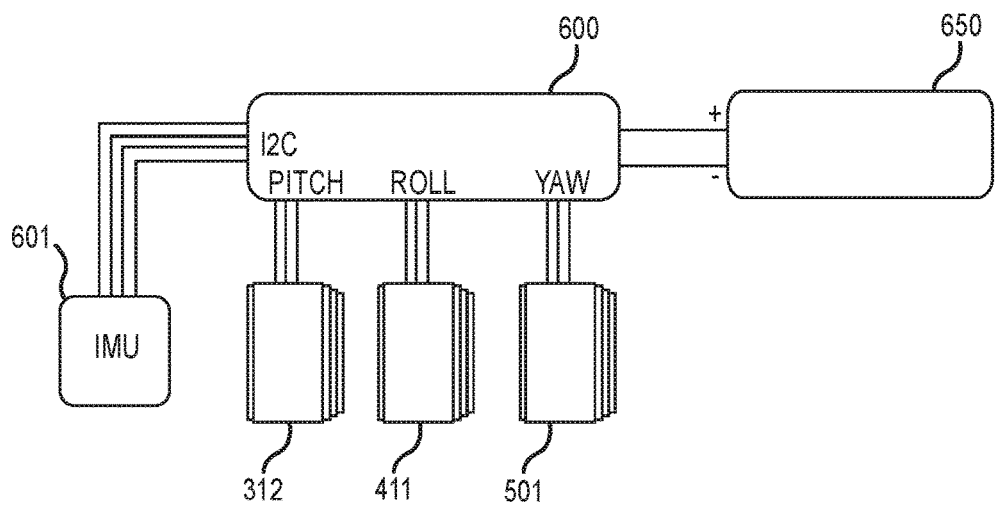
FIG. 10 is a schematic drawing showing the operations of the stabilization assembly.

As shown in the FIG. 10 schematic, the controller then sends movement commands to each of the pitch motor (312), roll motor (411) and yaw motor (501) as necessary. Encoders contained within each motor provide feedback to the controller (600) regarding the operation of each motor to ensure that the motors engage in movements consistent with commands from the controller (600) that result in stabilization of the support and stabilization apparatus (100) and its plurality of cameras (150) (as referenced in the various illustrated embodiments) and such that the resulting images being recorded by the plurality of cameras is stabilized and free of unwanted movement.

Referring to FIG. 9, the support and stabilization apparatus (100) is shown configured with the power source (651), ideally a battery. The power source (651) is secured to the support structure (110) via a hold down strap (211) attached to the underside of the bottom surface (145). The hold down strap (211) may be comprised of a Velcro strip for securing the power source (651) to the support structure (110). As shown in FIG. 9 and described above, commercially available power cables (213) are used to connect the power source (651) to the controller (600) and to connect the controller (600) to the sensor (601) and the controller (600) to the motors.

Further, in this embodiment, as shown in FIG. 9, the power source (651) may also be used to power other ancillary systems, including, for example, a cooling fan (220) which may be securably attached to the underside of the housing ring or bottom surface (145) as shown in FIG. 9, to provide additional cooling to the system (100).

As may be appreciated by one skilled in the art, the present disclosure may be embodied as methods. Specifically, the disclosure provides a method for active stabilization of a plurality of cameras arranged in a spherical array by means of gathering information about the horizon level of the spherical array of the plurality of cameras and transmitting that information to motors, which stabilize the horizon level in response the information provided.

It will be apparent to those skilled in the art that various modifications and variations can be made in the disclosed embodiments of the disclosed device and associated methods without departing from the spirit or scope of the disclosure. This includes the contemplation of improvements to camera, lens and/or other image capture technology that would provide for the capture of 360-degree, spherical images suitable for use in virtual reality recordings by means of a single camera capable of capturing a 360-degree spherical image as opposed to a plurality of cameras. This also includes improvements to motor and gimbal technology that would provide for a reduction in size of the central space required to house the motor assembly, including the possibility that the central space be simply an area where the motor assembly can be positioned and secured so as not to interfere with the 360-degree image to be photographed. Thus it is intended that the present disclosure covers the modifications and variations of the embodiments disclosed above provided that the modifications and variations come within the scope of any claims and their equivalents.

The invention claimed is:

1. A camera support and stabilization system comprising: a support apparatus configured to simultaneously retain and balance a plurality of photographic cameras and further configured to define a central space of the support apparatus; a pitch axis assembly mounted to the support apparatus and positioned within the central space wherein the said pitch axis assembly includes a pitch motor to rotate the support apparatus around the pitch axis and wherein the pitch motor is oriented vertically within the central space; a yaw axis assembly coupled with the pitch access assembly, the yaw axis assembly to rotate the support apparatus around the yaw axis and including a yaw motor that is oriented at a 90 degree angle to the pitch motor; a roll axis assembly coupled to the yaw axis assembly, the roll axis assembly to rotate the support apparatus around the roll axis, and including a roll motor that is oriented at a 90 degree angle to both the yaw motor and pitch motor; a sensor responsive to movement located on the support apparatus and in communication with a control module secured to the support apparatus with said control module programmed to receive and process inputs from the sensor and to control movement of the roll motor, pitch motor and yaw motor; and at least one attachment feature configured for enabling the support apparatus to be secured to another object.

2. A camera support and stabilization system as recited in claim 1 wherein the attachment feature is removably coupled to the pitch axis assembly.

3. A camera support and stabilization system as recited in claim 1 wherein the attachment feature is removably coupled to the roll motor assembly.

4. A camera support and stabilization system as recited in claim 1 further comprising a power source secured to the support apparatus.

5. A camera support and stabilization system as recited in claim 1 wherein the sensor is an inertial measurement unit.

6. A camera support and stabilization system as recited in claim 1 wherein the roll motor, yaw motor and pitch motor are brushless.

7. A camera support and stabilization system as recited in claim 1 wherein the roll motor, yaw motor and pitch motor have diameters between 20 mm and 300 mm.

8. A camera support and stabilization system as recited in claim 1 and further comprising a cooling fan secured to the support apparatus.

9. A camera support and stabilization system as recited in claim 1 further comprising a first mounting plate removably secured to the support apparatus, the pitch motor removably secured to the first mounting plate, a second mounting plate secured to the top of the pitch motor; the yaw motor removably secured to the second mounting plate; a third mounting plate removably secured to the yaw motor and the roll motor removably secured to the third mounting plate.

10. A camera support and stabilization system comprising: a support apparatus configured to simultaneously retain and balance a plurality of image capturing device(s) and further configured to define a central space of the support apparatus; a pitch axis assembly mounted to the support apparatus and positioned within the central space wherein the said pitch axis assembly includes a pitch motor to rotate the support apparatus around the pitch axis and wherein the pitch motor is oriented vertically within the central space; a yaw axis assembly coupled with the pitch access assembly, the yaw axis assembly to rotate the support apparatus around the yaw axis and including a yaw motor that is oriented at a 90 degree angle to the pitch motor; a roll axis assembly coupled to the yaw axis assembly, the roll axis assembly to rotate the support apparatus around the roll axis, and including a roll motor that is oriented at a 90 degree angle to both the yaw motor and pitch motor; a sensor responsive to movement located on the support apparatus and in communication with a control module secured to the support apparatus with said control module programmed to receive and process inputs from the sensor and to control movement of the roll motor, pitch motor and yaw motor.

\* \* \* \* \*